United States Patent Office 2,954,492
Patented Sept. 27, 1960

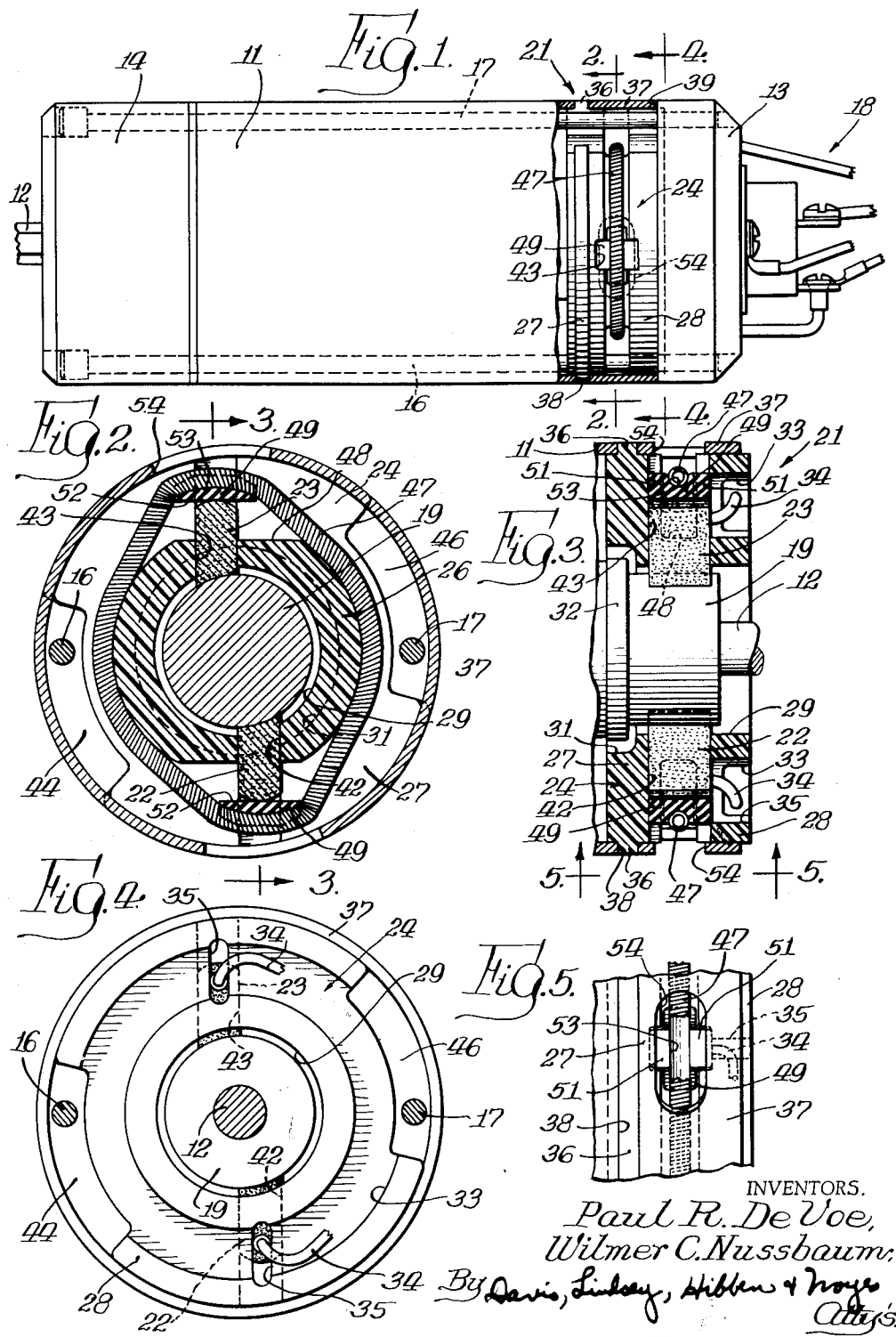

2,954,492

BRUSH RING ASSEMBLY

Paul R. de Voe, Dayton, and Wilmer C. Nussbaum, Xenia, Ohio, assignors to Thor Power Tool Company, a corporation of Delaware Filed Dec. 2, 1957, Ser. No. 699,973

7 Claims. (Cl. 310—239)

This invention relates to electrical machines of the type having commutators and more particularly to a brush assembly for such electrical machines.

It is a primary object of the present invention to provide an improved cartridge-like brush assembly for commutator-type electrical machines which brush assembly assures uniform and positive brush contact with the commutator throughout the life of the brush and which simplifies brush replacement.

Another object of the invention is to provide an improved brush assembly for commutator-type electrical machines which assembly is structurally compact, strong and avoids difficulties due to vibration.

Still another object of the invention is to provide an improved brush assembly of the foregoing character that can be economically manufactured.

A further object of the invention is to provide an improved brush assembly of the foregoing character that can withstand high temperature.

Still another object is to provide a brush assembly of the foregoing character for universal motors.

Other objects and advantages of the structure will become apparent from the following description taken in conjunction with the accompanying drawing wherein:

Fig. 1 is a plan view on a reduced scale of an electric universal type motor with a part of the casing broken away to show a preferred form of the brush assembly mounted therein;

Fig. 2 is a sectional view taken along line 2—2 in Fig. 1;

Fig. 3 is a sectional view taken along line 3—3 in Fig. 2;

Fig. 4 is a view taken along line 4—4 in Fig. 1 showing the assembly in elevation; and Fig. 5 is a fragmentary elevational view of the assembly taken along line 5—5 in Fig. 3.

Broadly speaking, the objects of this invention are accomplished by providing a novel brush assembly that has a set of brushes held and operatively positioned by a unitary dielectric bobbin or spool. The assembly is such that it is adapted to be mounted in the machine between the end bell and the stator frame around the commutator. A single endless tension member encircles the spool and uniformly presses each brush of the set inwardly for operative engagement with the commutator. The spool is adapted to be frictionally held in place in the motor by the motor frame and the end bell, and is easily adjusted and may be easily replaced in the motor. In addition, the brushes are individually easily replaced in the brush assembly.

Referring to the drawing, Fig. 1 illustrates one type of machine in which the instant invention is adapted to be used. The machine shown in Fig. 1 is a universal motor of the form often used in concrete vibrators, or the like. Concrete vibrators are well known in the art and comprise, generally speaking, a shaft member that is rotatively mounted in a housing, the shaft being eccentrically loaded to cause the housing to vibrate upon rotation thereof, and a motor for rotating the shaft. Universal motors are used in that environment because they can be operated on either alternating current or direct current. Furthermore, universal motors have a very high rotative speed under light load, and the speed is independent of line frequency if operated on alternating current. When used in this environment the motors may be completely enclosed. Therefore, the brushes of such a motor are subjected to the heat of the motor, vibrational loads and even impact loads. Thus, a universal motor is an excellent example of a machine in which the present invention is intended to function.

The universal motor shown in Fig. 1 comprises the usual laminated stator together with the field windings cooperable therewith and a wound rotor (none of the foregoing elements are shown since universal motors are well known in the art and form no part of the present invention). The rotor is operatively mounted in and generally concentric with the stator and the two elements are enclosed in a cylindrical jacket or motor frame 11. The rotor is carried on a drive shaft 12, one end of which is shown in Fig. 1. The ends of the motor are enclosed by a pair of end frame members or end bells 13 and 14, which end bells are provided with bearings (not shown) that support the drive shaft 12. In the present instance the motor is held in assembled relation by a pair of tie bolts 16 and 17 that extend longitudinally through the motor between the end bells 13 and 14. The end bell 13 is also provided with various electrical connectors, indicated generally at 18, that are adapted to be connected to a current source for driving the motor.

A commutator, shown generally at 19 in Figs. 2 and 3, is mounted in fixed relation on the shaft 12 between the rotor of the motor and the end bell 13 where it is closest to the connectors 18. Structural details of the commutator 19 are not shown, since the commutator forms no part of the present invention and its structure is well known in the art. The commutator 19 is, of course, generally cylindrical and the brush assembly, that constitutes the subject matter of this invention and which is shown generally at 21, cooperates with the commutator to conduct current to the revolving rotor in the usual manner.

The brush assembly 21 includes a pair of brushes 22 and 23 that are held for operative engagement with the commutator 19 by a brush holder 24. The brush holder 24 is a spool or bobbin-like ring member of dielectric, high temperature resistant material, preferably a moulded one-piece member of phenolic material. Furthermore, the holder 24 is sufficiently strong to resist or withstand the force of the tie bolts 16 and 17 when the holder is sandwiched between the end bell 13 and the adjacent end of the stator, spacing the one from the other.

Being spool or bobbin-like, the brush holder 24 has a hub portion 26 with radial flange portions 27 and 28 at opposite ends thereof. The hub portion 26 has a central opening or bore 29 therethrough for accommodating the commutator 19. The flange 27, in the present instance, faces one end of the rotor and stator of the motor and is counterbored, as at 31, to accommodate the structure 32 between the commutator 19 and the rotor. The opposite flange 28 faces the end bell 13 and is provided with a concentric groove 33 in the outer face thereof for accommodating pigtail brush leads 34 that connect the brushes 22 and 23 to the electrical connectors 18. Elongated slits 35 are provided through the wall of the flange 28 at the brush positions for bringing the leads 34 out of the assembly into the groove 33.

In the present instance the brush assembly 21 is held in fixed position in the motor by engagement with the frame member 11 and the end bell 13. The flanges 27 and 28 of the holder 24 are formed to be generally coextensive with the inner diameter of cooperating portions of the member 11 and the end bell 13. Spaced inwardly from its outer edge the flange 27 is provided with a radially extending rim 36. The rim 36 serves as an abutment, one side thereof engaging an end edge 38 of the motor frame 11 when the flange 27 is telescopically inserted into the frame 11. The opposite side of the rim 36 similarly engages a band or ring closure 37, hereinafter discussed. The band closure 37 extends to a position inwardly from the outer edge of the flange 28 for abutting engagement with an end edge 39 of the end bell 13, the flange 28 being telescopically inserted into the end bell 13. Thus, when the tie bolts 16 and 17 are tightened the brush assembly is frictionally held in fixed position relative to the motor frame 11 and the end bell 13. To replace the brush assembly 21, the tie bolts 16 and 17 are removed, releasing the end bell 13. The end bell 13 and the brush assembly 21 can be removed from the end of the shaft 12 and the brush assembly 21 replaced.

The brushes 22 and 23 are enclosed in and held by the brush holder 24 for operative engagement with the commutator 19. The brushes are mounted in inwardly extending guide slots or channels 42 and 43 provided through the holder 24. The slots 42 and 43 open into the bore 29 from opposite sides thereof and are spaced relative to each other so that the inner ends of the brushes 22 and 23 will be properly spaced relative to each other for operative engagement with the commutator 19. Proper positioning of the brushes relative to the field windings of the machine is accomplished by rotatively adjusting the entire brush assembly as will be more fully discussed hereinafter. The inner ends of the brushes are shaped to provide an area of engagement with the commutator 19.

The slots 42 and 43 are formed between the flanges 27 and 28 of the spool through the hub portion 26. The slots are rectangular in cross section and formed to provide a free fit with their respective brushes, which are also rectangular in cross section. In addition, the brushes are substantially longer than the thickness of the hub portion 26 and are wider than the space or groove between the flanges 27 and 28. Therefore, the slots are formed in part in the flanges 27 and 28 (as shown in Figs. 3 and 5) and provide continuous guide channels extending from the outer periphery of the spool to the bore 29 thereof. As was indicated above, although the brushes 22 and 23 are operatively positioned relative to each other by the spool-like brush holder 24, it is often necessary to rotatively adjust the position of the set of brushes relative to the filed windings of the machine. This is simply accomplished in the present instance by rotating the assembly 21 about its axis that is coincident with the axis of rotation of the commutator. To this end the flanges 27 and 28 are formed or cut in to provide gaps or spaces on opposite sides of the bore 29 between the brushes 22 and 23, as at 44 and 46, through which the bolts 16 and 17 pass. The spaces are such that the assembly can be rotated through a substantial arc without engaging the tie bolts and in this instance the spaces are arcuate. To adjust the rotative position of the assembly shown the tie bolts 16 and 17 are loosened and the entire assembly is turned to the proper position. When the proper position is reached, retightening of the tie bolts 16 and 17 prevents further unintentional rotation thereof.

Good electrical contact between the brushes 22 and 23 and the commutator 19 is insured by means that resiliently urge the brushes inwardly into engagement with the commutator. The urging force is sufficient to hold the end of the brushes solidly in contact with the commutator. Since the brushes are freely slidable in their respective channels, contact is maintained therebetween even though the commutator may be slightly out of round. Furthermore, the various brushes in the set are urged inwardly by substantially equal forces. This is accomplished by spring means which in the present instance comprises a garter or endless spring 47. The spring 47 is of beryllium copper. It is disposed about the hub portion 26 of the brush holder 24 in the groove or space between the flanges 27 and 28 thereof, the length of the spring being less than the circumference of the hub portion 26. The spring 47 rides over the outer end of each of the brushes as is shown most clearly in Fig. 2. Since the brushes are considerably longer than the thickness of the hub portion 26, the spring is stretched to the shape illustrated and thus urges the brushes inwardly with equal force and continuously until the brushes have worn down so that their outer ends are at the level of the hub portion 26 of the holder. Note that the hub portion 26 of the holder 24 has been flattened adjacent the brushes, as at 48, to provide maximum brush usage before brush replacement is required.

Beryllium copper is, of course, a conductor of electricity and to insulate the spring 47 from the brushes 22 and 23 the brushes are each capped with a shoe 49 of insulating material. The shoes 49 and their respective brushes are not interconnected in this case, the shoes merely rest on the upper ends of their respective brushes. To prevent the shoes from being displaced relative to their respective brushes each shoe is formed with laterally extending guide lugs 51 that engage the flanges 27 and 28 in the respective slots 42 and 43 for their associated brushes. Each shoe 49 is formed with a flat surface 52 that engages the outer end of its associated brush. Opposite the surface 52 the shoe 49 has an arcuate or curved trough 53 shaped to engage the stretched spring 47 as shown. The shoes 49 are longer parallel to the space between the flanges 27 and 28 than is the corresponding dimension of their associated slots and therefore bottom on the flat surfaces 48 of the hub portion 26 when their associated brushes have worn away a predetermined amount. When such occurs, of course, the worn brushes must be replaced.

The assembly is completed by the closure ring 37 that abuts the rim 36. The ring 37 snugly fits the peripheral surfaces of the flanges 27 and 28 and can be made to completely enclose the brushes 22 and 23, their shoes 49 and the spring 47 if desired. The ring 37 in the present instance, however, is provided with openings 54 that can be positioned directly over the brushes, as shown, for access thereto.

From the structure described it is apparent that the instant invention provides a novel cartridge-like brush assembly for electric machines that assures uniform positive brush contact with the commutator of an electric machine. The assembly is particularly well adapted for use with universal motors of the character that may be used where high vibration and impact loads are to be expected. The brush assembly provided can withstand high temperatures, can be economically manufactured, and is easily installed and adjusted. Furthermore, the brushes therein can be replaced with ease when worn.

Although the invention has been described in connection with a specific structural embodiment it is to be understood that certain various modifications and alternative structures may be resorted to without departing from the scope of the invention as defined in the appended claims.

We claim:

1. A brush ring assembly for electric machines of the type having a rotor provided with a commutator, a stator enclosed by a frame member, and an end member removably secured to one end of said frame member to enclose said one end, said assembly comprising a ring member of dielectric material having a central opening for accommodating the commutator and including a circumferential outwardly extending flange at each end thereof, said flanges defining a circumferential groove therebetween and being adapted to cooperate respectively with said one end of said frame member and said end member to position the assembly with its central opening generally concentric with the commutator, said ring member having a set of relatively spaced channels in communication between said central opening and said groove, a set of elongated brushes movably disposed in said channels, said channels aligning the inner ends of said brushes relative to each other for operative engagement with the commutator, a shoe of dielectric material on the outer end of said brushes in said groove, and an endless tension member disposed circumferentially around said ring member between said flanges, said tension member engaging each of said shoes for uniformly urging the individual brushes inwardly into engagement with the commutator.

2. A brush ring assembly according to claim 1 in which said channels are internal rectangular slots formed in said ring, said slots extending from said central opening outwardly to the peripheral edges of said flanges, said slots being wider than the groove and extending transversely of the same.

3. A brush ring assembly according to claim 1 in which each of said brushes has an electrical lead connected thereto adjacent its outer end and one of said flanges is provided with a set of elongated slits opening into said groove adjacent the outer ends of said brushes for accommodating movement of said leads as said brushes wear.

4. A brush ring assembly according to claim 1 in which said shoes have guide lugs cooperable with said channels for holding said shoes aligned with their associated brushes as the same are urged inwardly by said tension means.

5. A brush ring assembly for electric machines of the type having a rotor provided with a commutator, a stator enclosed by a frame member, and an end member removably secured to one end of said frame member to enclose said one end, said assembly comprising a ring member of dielectric material having a central opening for accommodating the commutator and adapted to be mounted in fixed position in the machine between the frame member and the end member, said ring member including outwardly extending flanges spaced to define therebetween a circumferential groove, one of said flanges being adapted to be telescopically inserted into said one end of the frame member and the other flange being adapted to be telescopically inserted into said end member for positioning said ring member with its central opening generally concentric with the commutator, a set of brushes operatively mounted in said ring member with their outer ends projecting into said groove, tension means disposed between said flanges and engaging the outer ends of said brushes for urging said brushes inwardly into operative contact with the commutator, and closure means disposed around said ring member over said groove.

6. A brush ring assembly according to claim 5 in which said one flange is provided with a radially extending positioning rim and said closure means is a band closure, said band closure and said rim abutting in edge-to-edge engagement, said rim and said band closure cooperating to form spacer means adapted to be frictionally engaged on opposite sides thereof by the frame member and the end member of the machine.

7. A brush assembly according to claim 5 in which said flanges have peripheral aligned gaps that accommodate means for securing the end member to the frame member to permit the assembly to be rotatively adjusted with respect to said members.

References Cited in the file of this patent

UNITED STATES PATENTS

| | | |
|---|---|---|
| 566,366 | Woods | Aug. 25, 1896 |
| 1,991,356 | Anderson | Feb. 19, 1935 |
| 2,195,801 | Thibault | Apr. 2, 1940 |
| 2,323,575 | Snowberger | July 6, 1943 |
| 2,545,939 | Breitenstein | Mar. 20, 1951 |
| 2,683,830 | Staak | July 13, 1954 |

UNITED STATES PATENT OFFICE

CERTIFICATION OF CORRECTION

Patent No. 2,954,492                                                      September 27, 1960

Paul R. de Voe et al.

It is hereby certified that error appears in the above numbered patent requiring correction and that the said Letters Patent should read as corrected below.

Column 6, line 23, after "brush" insert -- ring --.

Signed and sealed this 25th day of April 1961.

(SEAL)
Attest:

ERNEST W. SWIDER                                       DAVID L. LADD
Attesting Officer                                          Commissioner of Patents